(12) United States Patent
Ishikawa

(10) Patent No.: US 8,085,414 B2
(45) Date of Patent: Dec. 27, 2011

(54) IMAGE FORMING DEVICE CONFIGURED TO EXECUTE SCAN-TO-MEMORY AND DIRECT PRINT FUNCTIONS WHEN CONNECTED TO AN EXTERNAL DEVICE

(75) Inventor: Hiroko Ishikawa, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 1018 days.

(21) Appl. No.: 12/007,616

(22) Filed: Jan. 14, 2008

(65) Prior Publication Data

US 2008/0180714 A1 Jul. 31, 2008

(30) Foreign Application Priority Data

Jan. 30, 2007 (JP) ................. 2007-019776

(51) Int. Cl.
  *G06F 15/00* (2006.01)
  *G06F 3/12* (2006.01)
  *G06K 1/00* (2006.01)
(52) U.S. Cl. ..................... 358/1.13; 358/1.15
(58) Field of Classification Search .............. 358/1.1, 358/1.13, 1.14, 1.15
  See application file for complete search history.

(56) References Cited

U.S. PATENT DOCUMENTS

| 7,339,708 | B2 | 3/2008 | Namizuka |
| 7,958,278 | B2* | 6/2011 | Takada et al. ............ 710/20 |
| 2003/0214682 | A1 | 11/2003 | Namizuka |
| 2006/0028690 | A1 | 2/2006 | Kunori |
| 2006/0055975 | A1* | 3/2006 | Toda ........................ 358/1.16 |
| 2007/0216968 | A1 | 9/2007 | Enomoto |

FOREIGN PATENT DOCUMENTS

| JP | 1-149068 | 6/1989 |
| JP | 4-265068 | 9/1992 |
| JP | 8-265513 | 10/1996 |
| JP | 2002-323946 | 11/2002 |
| JP | 2004-007485 A | 1/2004 |

(Continued)

OTHER PUBLICATIONS

Japanese Office Action, with English translation, issued in Japanese Patent Application No. 2007-019776, mailed Mar. 3, 2009.
JP Office Action dtd Aug. 2, 2011, JP Appln. 2009-106692, English translation.
JP Office Action dtd Aug. 2, 2011, JP Appln. 2009-111815, English translation.

(Continued)

*Primary Examiner* — Douglas Tran
(74) *Attorney, Agent, or Firm* — Banner & Witcoff, Ltd.

(57) ABSTRACT

There is provided an image forming device comprising a connection unit to which an external device is detachably attached, a reading unit to read an image from an original to generate image data; an image forming unit to form an image; a controller that executes a plurality of modes including a scan-to-memory mode where image data is obtained through the reading unit and the obtained image data is stored in the external memory and a direct print mode where an image corresponding to image data stored in the external memory is formed, and a storage unit to store mode information concerning at least one mode, the at least one mode having been executed by the controller with respect to the external memory. The controller executes a mode stored in the storage unit as the mode information in response to connection of the external memory to the connection unit.

20 Claims, 8 Drawing Sheets

FOREIGN PATENT DOCUMENTS

| | | |
|---|---|---|
| JP | 2004-304729 A | 10/2004 |
| JP | 2004-362356 | 12/2004 |
| JP | 2005-174261 | 6/2005 |
| JP | 2005-252706 | 9/2005 |
| JP | 2006-44167 | 2/2006 |
| JP | 2006-060740 | 3/2006 |

OTHER PUBLICATIONS

JP Office Action dtd Aug. 2, 2011, JP Appln. 2009-112503, English translation.

* cited by examiner

IMAGE FORMING DEVICE CONFIGURED TO EXECUTE SCAN-TO-MEMORY AND DIRECT PRINT FUNCTIONS WHEN CONNECTED TO AN EXTERNAL DEVICE

CROSS-REFERENCE TO RELATED APPLICATION

This application claims priority under 35 U.S.C. §119 from Japanese Patent Application No. 2007-019776 filed on Jan. 30, 2007. The entire subject matter of the application is incorporated herein by reference.

BACKGROUND

1. Technical Field

Aspects of the present invention relate to an image forming device.

2. Related Art

Image forming devices having a so-called "scan-to-memory" function in which image data is obtained by reading an original and the image data is stored in an external memory, such as a USB memory, attached to the image forming device have been widely used. Japanese Patent Provisional Publication No. 2005-174261 (hereafter, referred to as JP2005-174261A) discloses an image forming device having a so-called direct print function in which data is read from an external memory attached to an image forming device and an image corresponding to the read data is printed on a sheet of paper.

In general, when an external memory attached to an image forming device having the scan-to-memory function becomes full of image data during execution of the scan-to-memory function, the image forming device suspends reading of an original and requires a user to replace the external memory with another memory. Then, the user replaces the external memory with another one and operates the image forming device to continue the scan-to-memory function.

In this case, the user needs to instruct the image forming device again to execute the scan-to-memory function and to restart a setting operation for setting reading conditions (e.g., resolution, a file format, etc.). Such a setting operation is very troublesome for the user.

Assuming that the case where, after finishing printing of images from an external memory, the user wants to print out images from a different external memory (a second external memory) in a direct print mode, the user is required to instruct the image forming device again to execute the direct print after attaching the second external memory to the image forming device and to restart the setting operation for setting print conditions (e.g., a sheet size, etc.). Such a setting operation for direct print is very troublesome for the user.

SUMMARY

Aspects of the present invention are advantageous in that an image forming device capable of eliminating troublesome work for at least one of scan-to-memory mode and direct print mode is provided.

According to an aspect of the invention, there is provided an image forming device, which comprises: a connection unit to which an external device is detachably attached; a reading unit configured to read an image from an original to generate image data; an image forming unit configured to form an image on a recording medium; a controller that executes a plurality of modes including a scan-to-memory mode where image data is obtained through the reading unit and the obtained image data is stored in the external memory connected to the connection unit and a direct print mode where an image corresponding to image data stored in the external memory is formed through the image forming unit on the recording medium; and a storage unit configured to store mode information concerning at least one mode of the plurality of modes, the at least one mode having been executed by the controller with respect to the external memory. In this configuration, the controller executes a mode stored in the storage unit as the mode information in response to connection of the external memory to the connection unit.

Since when an external memory is connected to the image forming device, a mode which was previously executed is executed by the image forming device. Such a configuration eliminates the need for designating a mode by a user.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

DETAILED DESCRIPTION

Hereafter, embodiments according to the invention will be described with reference to the accompanying drawings.

First Embodiment

Figure 1:
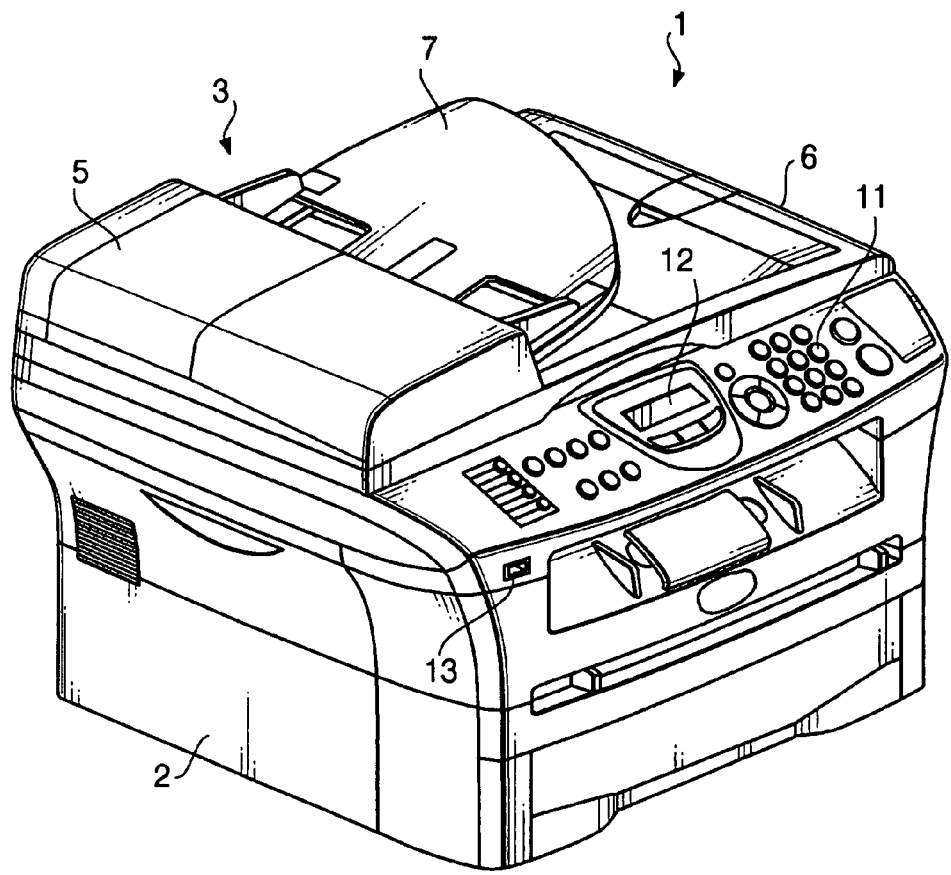
FIG. 1 is a perspective view of a multifunction peripheral according to an embodiment.
Figure 2:
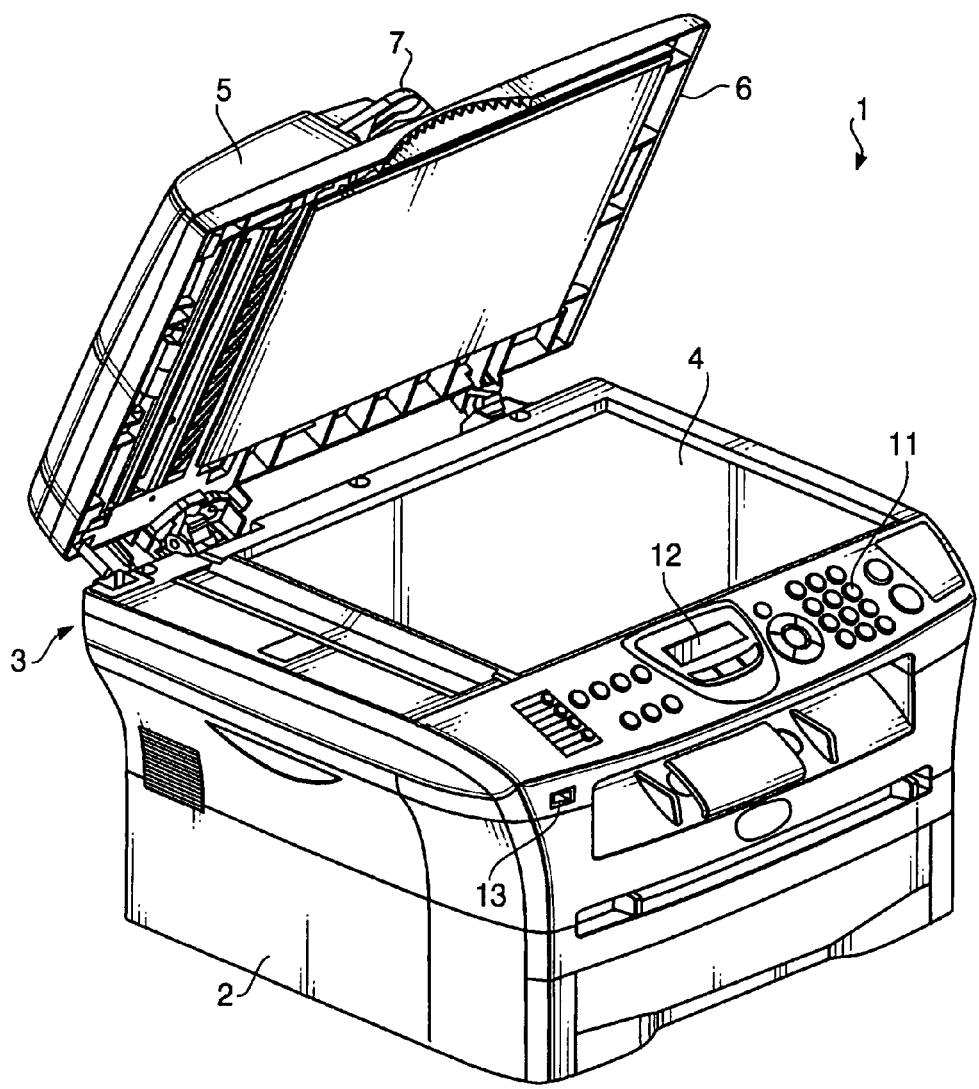
FIG. 2 illustrates a state where an original cover of the multifunction peripheral is opened upwardly.

FIG. 1 is a perspective view of a multifunction peripheral (MFP) 1 which is an example of an image forming device according to an embodiment. FIG. 2 illustrates a state where an original cover 6 is opened upwardly. The MFP 1 has multiple functions including a printing function, a scanner function, a copying function and a facsimile function. As shown in FIGS. 1 and 2, the MFP 1 includes a main body 2. On the upper side of the main body 2, a reading unit 3 is provided. The reading unit 3 includes an original placing unit 4 formed of a transparent glass plate. Under the reading unit 3, an image sensor, such as a CCD, is provided so that an image of an original placed on the original placing unit 4 can be read by the image sensor.

The original placing unit 4 is covered with the original cover 6 such that the original cover 6 can be openable and closable with respect to the original placing unit 4. As shown in FIGS. 1 and 2, the original cover 6 is provided with an ADF (Automatic Document Feeder) 5. The ADF 5 has an original tray 7 on which a plurality of sheets of paper can be placed, and is configured to carry the sheets of paper one-by-one, to read an image from the original through the image sensor, and to eject the sheet. The original tray 7 is provided with a sensor 8 (see FIG. 3) for detecting an original which has been placed. On the front side of the reading unit 3, an operation unit 11 including various buttons, a display unit 14 formed of a liquid crystal display, and a USB connection unit 13 are provided.

Figure 3:
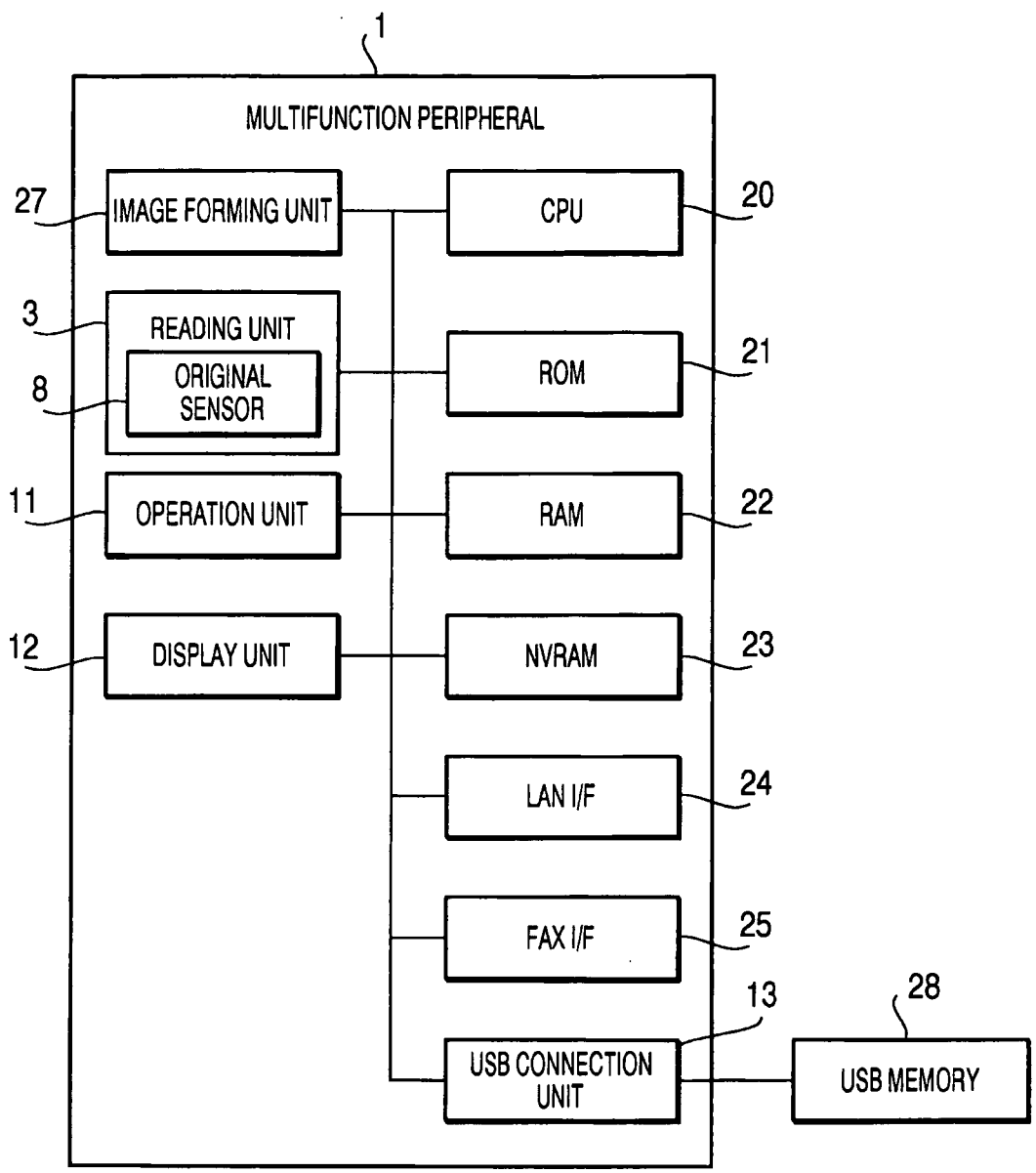
FIG. 3 is a block diagram of a control system of the multifunction peripheral.

FIG. 3 is a block diagram of a control system of the MFP 1. As shown in FIG. 3, the MFP 1 includes a CPU 20, a ROM 21, a RAM 22, an NVRAM (Non-Volatile Memory) 23, a network interface 24, a facsimile interface 25, and the USB connection unit 13. Further, as shown in FIG. 3, an image forming unit 27, the reading unit 3, the operation unit 11 and the display unit 12 are connected to the CPU 20.

In the ROM 21, various programs for controlling the MFP 1 are stored. The CPU 20 executes various processes in accordance with the programs stored in the ROM 21 while using the RAM 22 and the NVRAM 32 as work memories to save various types data (e.g., processing results).

The network interface 24 interfaces the MFP 1 with an external device via a network (not shown). The MFP 1 is able to communicate with external devices through the network interface 24. The facsimile interface 25 is connected to a telephone network (not shown) so as to allow the MFP 1 to perform facsimile data communication with external devices. To the USB connection unit 13, an external device (e.g., an USB memory 28) can be detachably attached. The image forming unit 27 is configured to form an image on a recording medium such as a sheet of paper.

Hereafter, operations of the MFP 1 are explained. When the MFP 1 is turned to ON, the CPU 20 executes an initialization process, and the MFP 1 enters a normal standby state. In the normal standby state, present date and time and letters "FAX" are displayed on the display unit 12, for example. In this state, by placing an original on the reading unit 3 inputting a telephone number of a destination through the operation unit 11 and instructing the MFP 1 to start data transmission, the user is able to execute facsimile data transmission. Further, the MFP 1 executes a printing operation or a scanning operation in response to a command inputted by the user through the operation unit 11 or a command inputted externally from the network interface 24.

As described in detail below, the user is able to instruct the MFP 1 to execute a scan-to-memory mode or a direct print mode by conducting a predetermined operation on the MFP 1 in a state where the USB memory 28 is connected to the USB connection unit 13.

Figure 4:
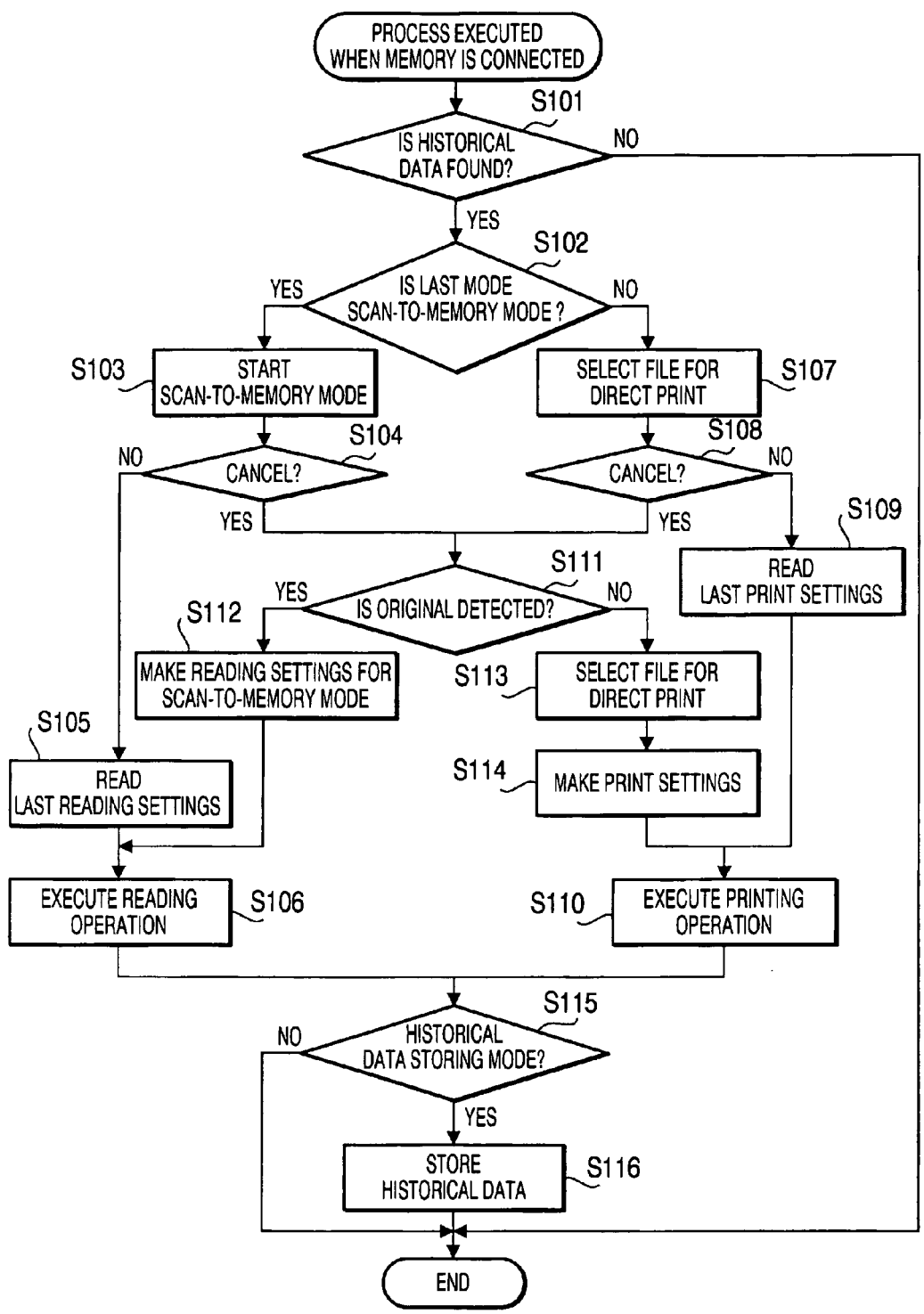
FIG. 4 is a flowchart illustrating a "process executed when memory is connected" to be executed when an external memory is attached to the multifunction peripheral.

FIG. 4 is a flowchart illustrating a process (hereafter, referred to as a "process executed when memory is connected") to be executed when an external memory is attached to the MFP 1. In the normal standby state the CPU 20 monitors the USB connection unit 13 to judge whether the USB memory 28 is connected to the USB connection unit 13, and the "process executed when memory is connected" is executed when the CPU 20 detects connection of the USB memory 28 to the USB connection unit 13.

First, the CPU 20 judges whether the RAM 22 has historical data concerning operations conducted for the USB memory 28 which was connected to the MFP 1 last time (step S101). On the MFP 1, the user is able to designate one of modes in the "process executed when memory is connected" by executing function setting. In the function setting, the user is allowed to designate one of a historical data storing mode and a historical data non-storing mode. If the MFP 1 is set for the historical data storing mode, the CPU 20 stores, as historical data for the USB memory 28, the executed mode and settings used for the mode in the RAM 22 when the scan-to-memory mode or the direct print mode is executed. Regarding the scan-to-memory mode, the settings to be stored as the historical data are reading settings. Regarding the direct print mode, the settings to be stored as the historical data are print settings. It should be noted that there are cases where no historical data is found in the RAM 22 if the MFP 1 is in the historical data non-storing mode or when the USB memory 28 is connected to the MFP 1 initially from power ON of the MFP 1.

If the RAM 22 does not have the historical data concerning operations for the USB memory 28 which was connected to the MFP 1 last time (S101: NO), the "process executed when memory is connected" terminates, and the MFP 1 enters the normal standby state again. If the historical data is stored in the RAM 22 (S101: YES), the CPU 20 judges whether the mode stored in the historical data is the scan-to-memory mode (i.e., whether the last mode is the scan-to-memory mode) (step S102). If the mode stored in the historical data is the scan-to-memory mode (S102: YES), steps for the scan-to-memory mode are started.

When the scan-to-memory mode is started, the CPU 20 displays a message (e.g., "Scan to USB Start Scan") for requesting a user to input an execution command on the display unit 12 and the MFP 1 enters a waiting state of waiting for a user input from the operation unit 11. In this state, the user is able to input a command for continuing the scan-to-memory mode or a cancellation command for canceling the execution of the scan-to-memory mode.

If the command for continuing the scan-to-memory mode is inputted (S104: NO), control proceeds to step 5105 where the last reading settings (i.e., the reading settings of the scan-to-memory mode which were executed for the USB memory 28 last time) are read from the historical data in the RAM 22. The reading settings are settings regarding reading parameters, such as, resolutions (e.g., 150 dpi, 200 dpi, 600 dpi and etc.), the number of colors (e.g., color/monochrome setting or the number of gray scales in the monochrome mode), file formats (e.g., PDF, JPEG, TIFF and etc.).

Then, the CPU 20 executes a reading operation under the reading settings obtained from the historical data (step S106). Thus, image processing can be executed for image data obtained by the reading unit 3, and an image data file generated by the image processing is stored in the USB memory 28.

If the mode stored in the historical data is the direct print mode (S102: NO), the CPU 20 executes steps for the direct print mode (step 107). When the direct print mode is started, the CPU 20 displays a message (e.g., "Direct Print Select File") for requesting the user to select a file on the display unit 12, and the MFP 1 enters a waiting state waiting for an input from the user. In this state, the user is able to designate a file to be printed from among the files stored in the USB memory 28, or the user is able to input a cancellation command for canceling execution of the direct print mode.

After the file selection is finished (S108: NO), the last print settings stored as the historical data concerning the direct print mode executed for the USB memory 28 which was connected to the MFP 1 last time are read (step S109). The print settings are settings regarding print parameters, such as, a sheet size, designation of both side printing, designation of rimless printing and the number of pages in one sheet. Then, the CPU 20 reads the selected file from the USB memory 28, and controls the image forming unit 27 to execute a printing operation in accordance with the obtained print settings.

If the cancellation command is inputted in the scan-to-memory mode (S104: YES) or the cancellation command is inputted in the direct print mode (S108: YES), the CPU 20 suspends the current mode to judge whether an original is placed on the original tray 7 in accordance with the output of the original sensor 8 (step S111).

If an original is detected (S111: YES), the CPU 20 starts the scan-to-memory mode, and displays a screen for requesting the user to input reading settings (step S112). After the reading settings are inputted, the CPU 20 executes the reading operation through the reading unit 3 in accordance with the reading settings inputted in step S112 (step S106).

If an original is not detected by the original sensor 8 (S111: NO), the CPU 20 starts the direct print mode, and displays a message for requesting the user to select a file on the display unit 12 (step S113). After a file is selected, the CPU 20 displays a screen for requesting the user to input the print settings on the display unit 12 (step S114). Then, the CPU 20 reads the selected file from the USB memory 28, and controls the image forming unit 27 to execute the printing operation in accordance with the print settings (step S110).

After the reading operation (S106) is finished, the scan-to-memory mode terminates. After the printing operation (S110) is finished, the direct print mode (S110) terminates. As described above, the user is able to set the mode (to be executed when the scan-to-memory mode or the direct print mode is finished) to one of the historical data storing mode and the historical data non-storing mode. If the historical data storing mode is designated (S115: YES), the operations conducted for the USB memory 13 currently connected to the USB connection unit 13, i.e., the mode executed for the current USB memory 13 and settings (the reading settings or the print settings) used in the mode, are stored in the RAM 22 as historical data (step S116).

If the historical data non-storing mode is selected (S115: NO), historical data is not stored. Then, the "process executed when memory is connected" terminates, and the MFP 1 enters the normal standby state.

As described above, if no historical data concerning the USB memory 28 is stored (S101: NO), the MFP 1 returns to the normal standby mode. In this case, after the scan-to-memory mode or the direct print mode is executed, historical data concerning the executed mode is stored if the history memory mode has been selected the function setting. Therefore, when the USB memory 28 (i.e., another USB memory) is connected to the MFP 1, the scan-to-memory mode or the direct print mode is executed in accordance with the historical data.

Hereafter, advantages achieved by the first embodiment are described. In the above mentioned embodiment, the mode previously executed (i.e., the scan-to-memory mode or the direct print mode) can be executed when the USB memory 28 is connected to the MFP 1. Such a configuration eliminates the need for designating the operation mode again.

If it is judged that the last mode is the scan-to-memory mode when the USB memory 28 is connected to the MFP 1, the scan-to-memory mode is executed in accordance with the stored reading settings. Such a configuration eliminates the need for designating the reading settings again.

If it is judged that the scan-to-memory mode is executed as the last mode when the USB memory 28 is connected to the MFP 1, the MFP 1 enters the waiting state of waiting for a user input for designating continuation or cancellation of the mode. Therefore, the user is able to suspend execution of the scan-to-memory mode if the user does not want to execute the scan-to-memory mode. Such a configuration makes it possible to prevent undesirable modes from being executed on the MFP 1.

If it is judged that the last mode is the direct print mode when the USB memory 28 is connected to the MFP 1, the direct print mode is executed in accordance with the stored print settings. Such a configuration makes it possible to eliminate the need for designating the print settings again.

If the previous mode is not obtained, for example, at the time immediately after power on of the MFP 1, the mode (scan-to-memory mode or the direct print mode) is not started. Therefore, it is possible to prevent an undesired mode from being started.

If it is judged that the direct print mode is executed as the last mode when the USB memory 28 is connected to the MFP 1, the MFP 1 enters a waiting state of waiting for continuation or cancellation of the direct print mode. Such a configuration makes it possible to prevent undesirable modes from being executed on the MFP 1.

As described above, the user is able to designate whether to execute the stored mode when the USB memory 28 is connected to the MFP 1. Such a configuration enables the user to change the mode to be executed in accordance with environmental conditions regarding users. For example, the MFP 1 may be controlled not to execute the stored mode in a user environment where a relatively large number of users use an image forming device, while the MFP 1 may be controlled to execute the stored mode in a user environment where the number of users who use an image forming device is small. It is understood that such a configuration is convenient for users.

If the execution of the stored mode is cancelled, the MFP 1 predicts a mode desired by the user in accordance with a detection result of an original. It is understood that such a configuration is convenient for users.

In the case where the scan-to-memory mode or the direct print mode is executed, the user may leave the MFP 1, for example, to replace the USB memory 28 with another USB memory, to transfer data in the USB memory 28 to another computer, or to replace the files in the USB memory 28 with other files. Even if another person uses the MFP 1 while the user leaves the MFP 1, the user is able to execute the same process as the last mode immediately because the last historical data can be read when the USB memory 28 is connected to the MFP 1.

Second Embodiment

Hereafter, a second embodiment is explained with reference to FIGS. 5 to 7. Since a structural configuration and a control system of a MFP according to the second embodiment are substantially the same as those of the first embodiment shown in FIGS. 1 to 3, FIGS. 1 to 3 are used for explanations of the second embodiment. In the following, only the features of the second embodiment are explained.

Figure 5:
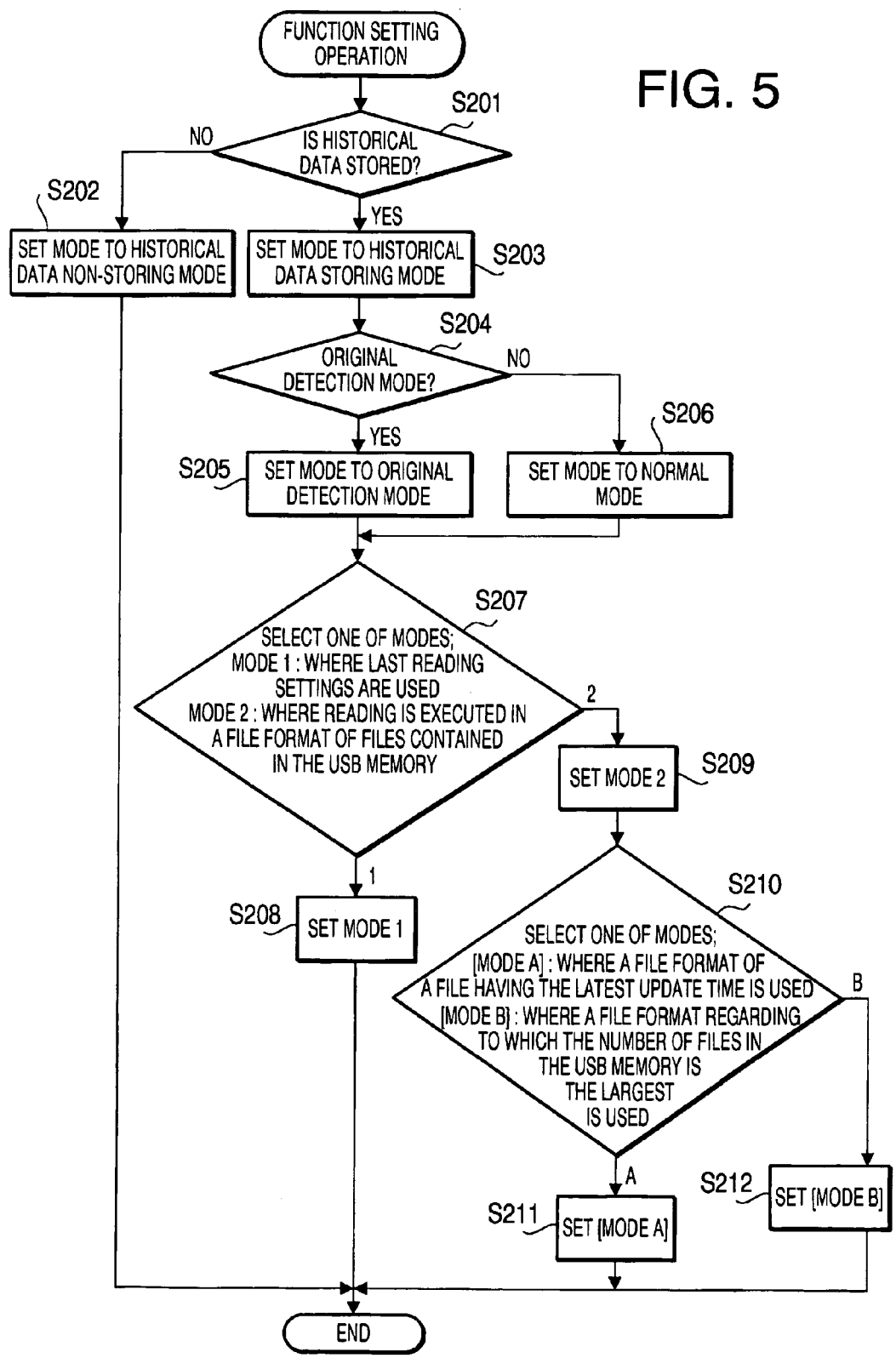
FIG. 5 is a flowchart illustrating a function setting process for setting various operation modes related to the "process executed when memory is connected".

FIG. 5 is a flowchart illustrating a function setting process for setting various operation modes related to a "process executed when memory is connected". The function setting process is executed by the CPU 20 when a predetermined user operation is conducted by the user through the operation unit 11 in the normal standby mode.

First, the CPU 20 displays a screen requesting the user to designate whether to store operations conducted for the USB memory 28 on the display unit 12 (step S201). If a command indicating that the user does not want to store the operations is inputted via the operation unit 11 (S201: NO), the CPU 20 sets a mode to be executed to the historical data non-storing mode (step S202). As used herein, the phrase like "a CPU sets a mode to . . . " means that the CPU stores a setting value regarding a mode to be executed in the NVRAM 23. Then, the function setting process terminates.

If a command indicates that the user wants to store the operations for the USB memory 28 (S201: YES), control proceeds to step S203 where the CPU 20 sets a mode to be executed to the historical data storing mode (step S203). After the historical data storing mode has been set, the CPU 20 displays, on the display unit 12, a screen for requesting the user to select one of an original detection mode where a mode corresponding to a detected status related to an original is executed and a normal mode where a mode corresponding to the stored historical data is executed (step S204).

If the original detection mode is selected (S204: YES), the CPU 20 sets a mode to be executed to the original detection mode (step S205). If the normal mode is selected (S204: NO), the CPU 20 sets a mode to be executed to the normal mode (step S206).

Next, the CPU 20 displays a screen for requesting the user to select one of modes "MODE 1: where the last reading settings are used" and "MODE 2: where reading is executed in a file format of files contained in the USB memory 28" (step S207). If the MODE 1 is selected (S207: 1), the CPU 20 sets a mode to be executed to the MODE 1 (step S208). Then, the function setting process terminates. If the MODE 2 is selected (S207: 2), the CPU 20 sets a mode to be executed to the MODE 2 (step S209).

Next, the CPU 20 displays a screen for requesting the user to select one of operations to be executed if more than one file format is found in the USB memory 88 (step S210). In step S210, the user is able to select one of a mode A where a file format of a file having the latest update time is used and a mode B where a file format regarding to which the number of files in the USB memory 88 is the largest is used. If one of the mode A and the mode B is selected by the user (S210: A or S210: B), the CPU 20 sets a mode to be executed to the selected mode (step S211 or S212).

It is understood that various types of file formats (e.g., TXT, DOC, XLS, PPT, etc.) excepting the file formats usable in the scan-to-memory mode (e.g., PDF, JPEG, TIFF, etc.) and file formats usable in the direct print mode (e.g., PDF, JPEG, TIFF, PRN) can be stored in the USB memory 28. However, it should be understood that file formats which can be used as candidates for the above mentioned file format selection in the scan-to-memory mode are limited to ones (PDF, JPEG, TIFF, etc.) in which files can be stored in the scan-to-memory mode (i.e., ones which the scan-to-memory mode supports).

Figure 6:
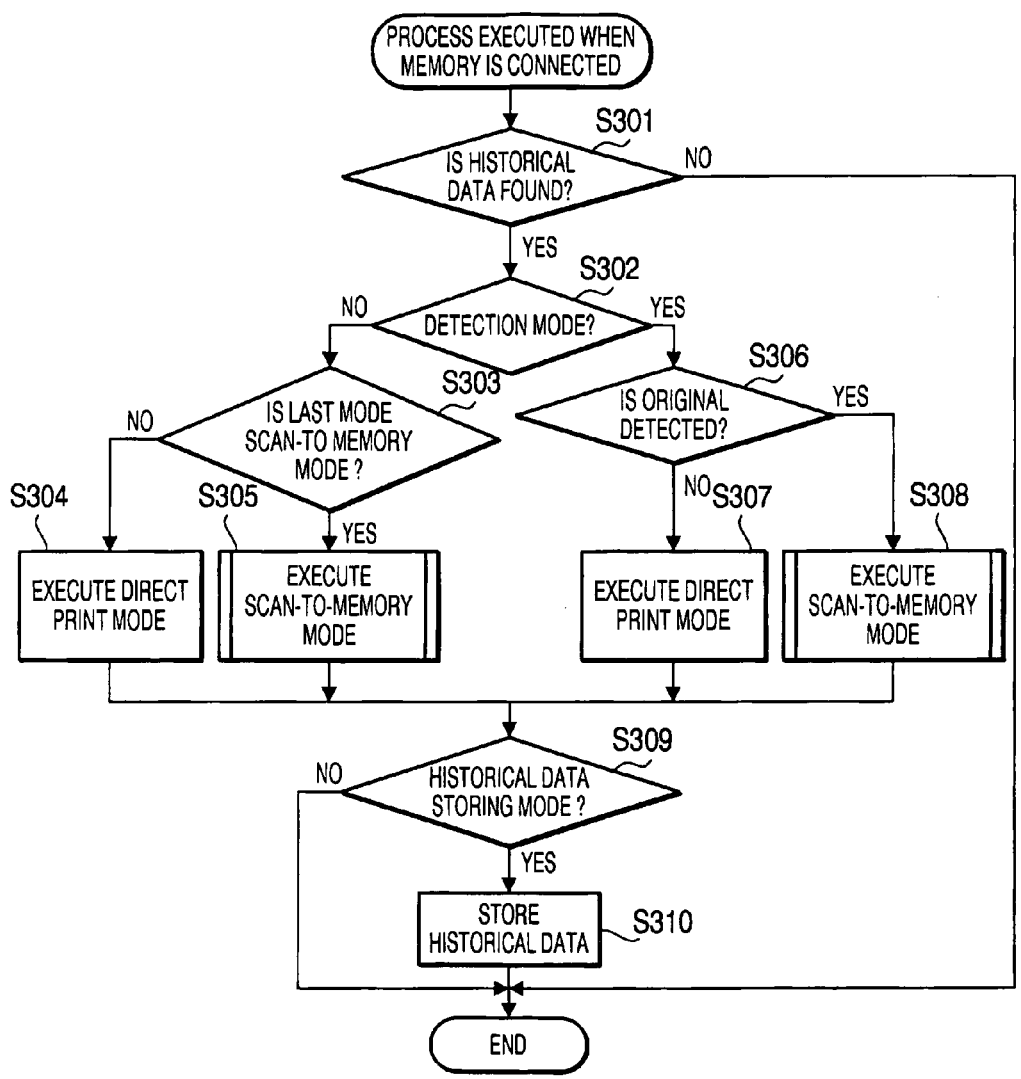
FIG. 6 is a flowchart illustrating a "process executed when memory is connected" according to a second embodiment.

FIG. 6 is a flowchart illustrating a "process executed when memory is connected" according to the second embodiment. FIG. 7 is a flowchart illustrating the scan-to-memory mode.

The CPU 20 initiates the "process executed when memory is connected" when the USB memory 28 is connected to the USB connection unit 13 in the normal standby state. First, the CPU 20 judges whether the RAM 22 has historical data concerning operations conducted for the USB memory 28 which was connected to the MFP 1 last time (step S301). If the historical data is not stored in the RAM 22 (S301: NO), the "process executed when memory is connected" terminates. Then, the MFP 1 returns to the normal standby state.

If the historical data is stored in the RAM 22 (S301: YES), the CPU 20 judges whether a mode to be executed has been set to the original detection mode or the normal mode by the function setting process (step S302). If a mode to be executed is set to the normal mode (S302: NO), the CPU 20 refers to the historical data and judges whether the last mode is the scan-to-memory mode (step S303). If the last mode is the direct print mode (S303: NO), the CPU 20 executes the direct print mode (step S304). If the last mode is the scan-to-memory mode (S303: YES), the CPU 20 executes the scan-to-memory mode (step S305).

If it is judged in step S302 that a mode to be executed is set to the original detection mode (S302: YES), control proceeds to step S306 where the CPU 20 judges whether an original on the original tray 7 is detected by the original sensor 8. If no original is detected (S306: NO), the CPU 20 executes the direct print mode (step S307). If an original is detected (S306: YES), the CPU 20 executes the scan-to-memory mode (step S308).

When the direct print mode is executed in step S304 or S307, the CPU 20 reads the print settings stored as historical data for the USB memory 28 which was connected to the MFP 1 last time and executes a printing operation.

Figure 7:
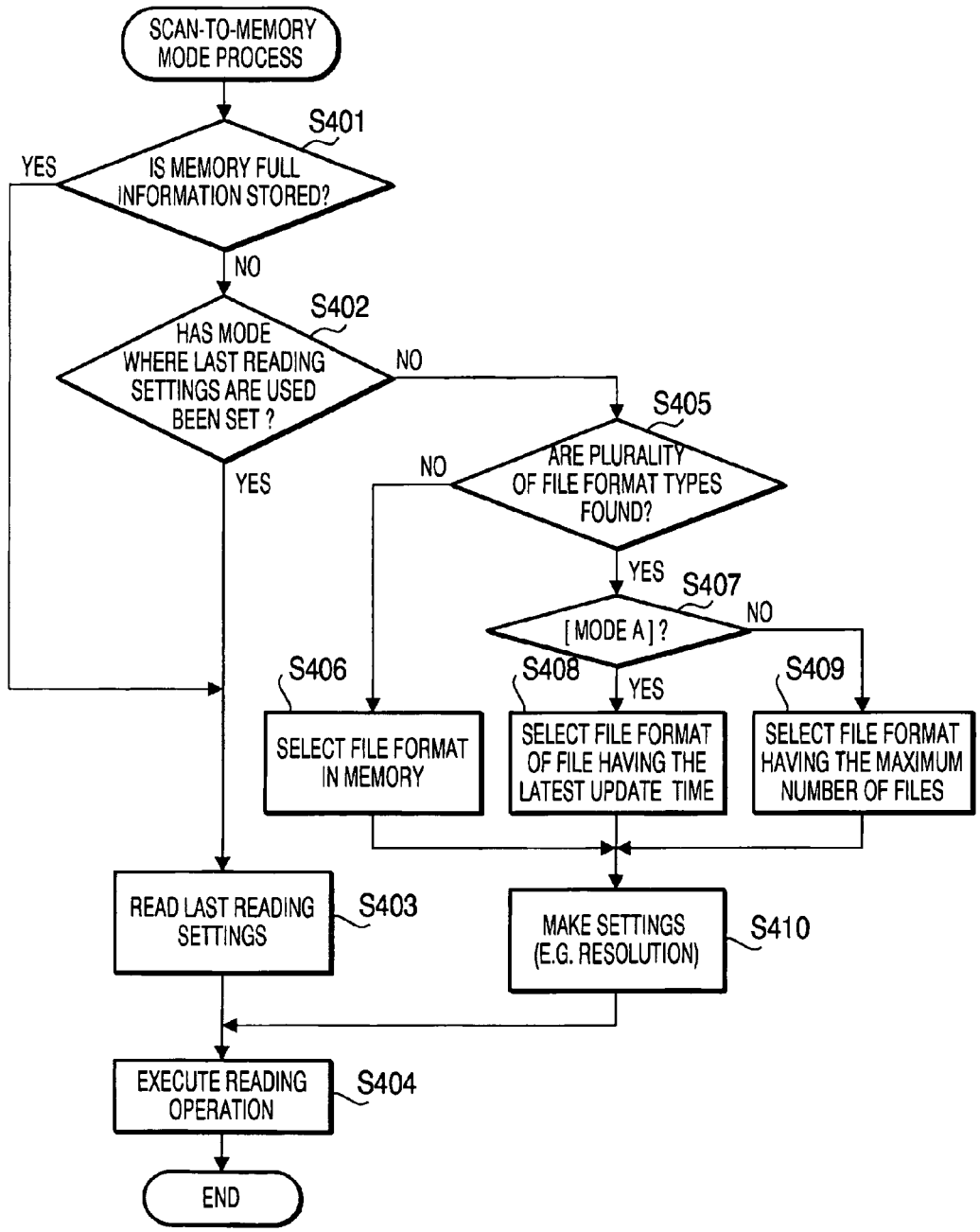
FIG. 7 is a flowchart illustrating a scan-to-memory mode.

When the scan-to-memory mode is executed in step S305 or S308, the CPU 20 executes the scan-to-memory mode process shown in FIG. 7. First, the CPU 20 judges whether memory full information regarding the USB memory 28 which was connected to the MFP 1 last time is stored in the RAM 22 (step S401). The memory full information represents information to be stored as historical data in the RAM 22 when the USB memory 28 becomes a memory full state during the reading process of the scan-to-memory mode. In this case, when the CPU 20 stores the memory full information in the RAM 22, the scan-to-memory mode which is currently running is suspended.

If the memory full information is not stored (S401: NO), the CPU 20 judges whether the mode where the last reading settings are used has been set (step S402). If the mode where the last reading settings are used has been set (S402: YES), the CPU 20 reads the last reading settings from the RAM 22 (step S403). Then, the CPU 20 executes the reading operation in accordance with the obtained reading settings (step S404).

If the mode where the reading operation is executed in a file format of files contained in the USB memory 28 has been set (S402: NO), control proceeds to step S405 where the CPU 20 checks data of the USB memory 28 to judge whether the USB memory 28 has more than one file format supported by the scan-to-memory mode (step S405). If only one file format type is found in the USB memory 28 (S405: NO), the CPU 20 selects the one file format type as a file format in which files are stored in the scan-to-memory mode (step S406). If more than one file format is found (S407: YES), control proceeds to step S407 where the CPU 20 judges whether the mode A has been set.

If the mode A has been set (S407: YES), a file format of a file having the latest update time of all files in the USB memory 28 is defined as a file format to be used to store files (step S408). If the mode B has been set by the function setting process (S407: NO), control proceeds to step S409 where a file format regarding to which the number of files in the USB memory 88 is the largest is defined as a file format to be used to store files. In this case, if more than one candidate is found for selection for storing of files, the CPU 20 may request the user to select one of the candidates.

After a file format for storing of files is thus selected, the CPU 20 displays a screen for requesting the user to set reading settings other than the file format on the display unit 12 (step S410). In this case, the CPU 20 may read the reading settings from the RAM 22. Then, the CPU 20 executes the reading operation in accordance with the reading settings.

If it is judged in step S401 that the memory full information regarding the USB memory 28 which was connected to the MFP 1 last time is stored (S401: YES), control proceeds to step S403 where the CPU 20 reads the reading setting stored as historical data. Then, the CPU 20 executes the reading operation in accordance with the obtained reading settings (S404). That is, in this case, the CPU 20 executes the reading operation in the same reading settings as those used for the USB memory 28 which was connected to the MFP 1 last time. After the reading operation is thus executed, the scan-to-memory mode process terminates.

After the CPU 20 executes the direct print mode in step S304 or S307, or the CPU 20 executes the scan-to-memory mode in step S305 or S308, the CPU 20 judges whether the historical data storing mode has been set by the function setting process (step S309). If the historical data storing mode has been set (S309: YES), the CPU 20 stores the executed mode and reading settings or print settings in the RAM 22 as historical data. If the historical data non-storing mode has been set (S309: NO), the "process executed when memory is connected" terminates without storing the mode and the settings.

Hereafter, advantages of the second embodiment are described. As described above, if it is judged that the memory full information is stored for the USB memory 28 which was connected to the MFP 1 last time when the USB memory 28 is connected to the MFP 1, the CPU 20 executes the scan-to-memory mode in the last reading settings regardless of the mode designated by the function setting process. If the USB memory 28 becomes a memory full state during the execution of the scan-to-memory mode, there is a relatively high possibility that the reading operation is executed in the same reading settings for the subsequently connected USB memory 28. Therefore, according to the embodiment, the scan-to-memory mode can be executed appropriately in such situations.

When the USB memory is connected to the MFP 1, image data can be stored in a file format matching a file format of a file stored in the USB memory. Such a configuration eliminates the need for setting a file format of image data to be stored.

As described above, the user is allowed to select one of a storing operation where a file is stored in a file format stored in the RAM 22 and a storing operation where a file is stored in a file format matching a file format of a file stored in the USB memory 28. Such a configuration is very convenient for users.

Further, according to the second embodiment, the user is allowed to switch between the normal operation where the CPU 20 executes the previously executed mode and the original detection mode where modes are selectively executed in accordance with the detection status regarding an original.

Third Embodiment

Hereafter, as a third embodiment, a variation of the above mentioned "process executed when memory is connected" (FIG. 6) of the second embodiment is described. Since the third embodiment corresponds to a variation of the process shown in FIG. 6, in the following only the features of the third embodiment are described.

Figure 8:
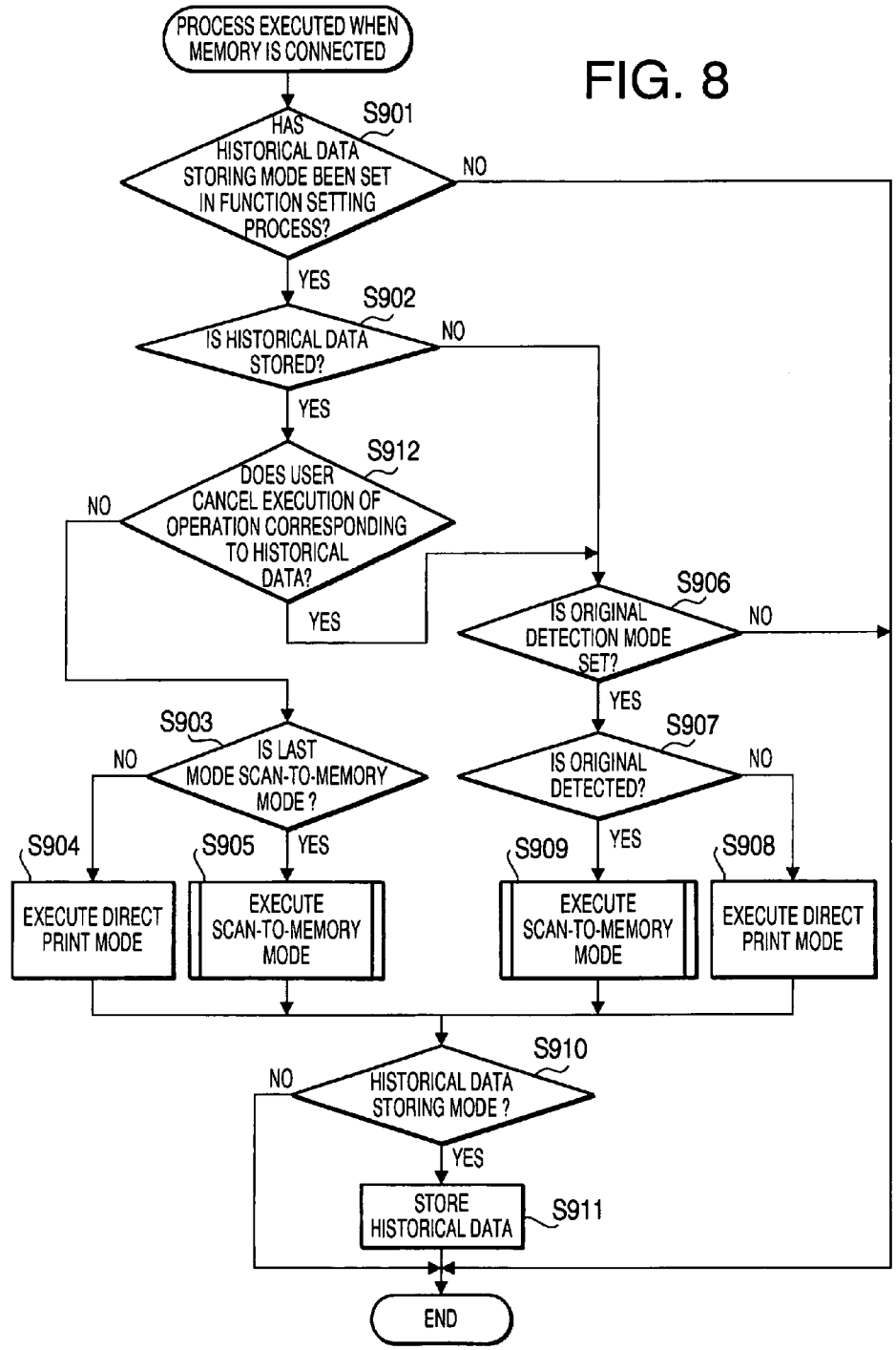
FIG. 8 is a flowchart illustrating a "process executed when memory is connected" according to a third embodiment.

FIG. 8 is a flowchart illustrating a "process executed when memory is connected" according to the third embodiment. The CPU 20 initiates the "process executed when memory is connected" when the CPU 20 detects that the USB memory 28 is connected to the USB connection unit 13 in the normal standby state. First, the CPU 20 judges whether "the historical data storing mode" for storing operations conducted last time has been set in the function setting process shown in FIG. 5 (step S901). If the historical data storing mode has not been set (S901: NO), the "process executed when memory is connected" terminates. Then, the MFP 1 returns to the normal standby state. If the historical data storing mode has been set (S901: YES), the CPU 20 judges whether the RAM 22 has historical data concerning operations conducted for the USB memory 28 which was connected to the MFP 1 last time (step S902).

If the historical data is not stored in the RAM 22 (S902: NO), the CPU 20 judges whether a mode to be executed has been set to the original detection mode or the normal mode in the function setting process shown in FIG. 5 (step S906). If a mode to be executed is set to the normal mode (S906: NO), the "process executed when memory is connected" terminates. Then, the MFP 1 returns to the normal standby state. After the MFP 1 returns to the normal standby state, the direct print mode, the scan-to-memory mode and etc. can be executed on the MFP 1 in accordance with user operations.

If a mode to be executed is set to the original detection mode (S906: YES), the CPU 20 judges whether an original on the original tray 7 is detected by the original sensor 8 (step S907). If no original is detected (S907: NO), the CPU 20 executes the direct print mode (step S908). If an original is detected (S907: YES), the CPU 20 executes the scan-to-memory mode shown in FIG. 7 (step S909).

If the historical data is stored in the RAM 22 (S902: YES) and the user does not cancel execution of the operation corresponding to the historical data (S912: NO), the CPU 20 refers to the historical data and judges whether the last mode is the scan-to memory mode (step S903). If the last mode is the direct print mode (S903: NO), the CPU 20 executes the direct print mode (step S904). If the last mode is the scan-to-memory mode (S903: YES), the CPU 20 executes the scan-to-memory mode shown in FIG. 7 (step S905).

If the historical data is stored in the RAM 22 (S902: YES) and the user cancels execution of the operation corresponding to the historical data (S912: YES), steps from S906 are executed as in the case where the historical data is not stored in the RAM 22.

In addition to the advantages achieved by the second embodiment, the third embodiment has an advantage that, if the USB memory 28 is connected to the MFP 1 immediately after the user switches a mode to be executed to the "the historical data storing mode" and sets the original detection mode in the function setting process, the MFP 1 automatically executes the scan-to-memory mode or the direct print mode in accordance with a result of detection of an original and therefore it is possible to save the user from having to set an operation mode.

Although the present invention has been described in considerable detail with reference to certain preferred embodiments thereof, other embodiments are possible.

In the above mentioned embodiments, an USB memory is used as an external memory. However, various types of memory devices such a memory card can be used as an external memory. The image forming device may be configured to support a plurality of types of memory devices.

In the above mentioned embodiment, the historical data relates to the USB memory which was connected to the MFP 1 last time. That is, in the above mentioned embodiment, the last historical data is used. However, historical data relating to the USB memory connected to the MFP 1 in earlier stages may be used additionally to the last historical data. For example, the CPU 20 may select and execute a mode having the largest number of times of executions of all of modes by referring to the historical data (i.e., the last and further earlier historical data) concerning USB memories connected to the MFP 1 in the last and further earlier stages.

If an external memory has an identification number of a user or an identification number of the external memory, the function setting (i.e., the operation modes) may be stored for each of such identification numbers. Further, in this case, historical data may be stored for each of such identification numbers so that when the external memory is connected to the image forming device, the image forming device can read and use the historical data of which identification number is identical with the identification number of the external memory. If the image forming device supports a plurality of types of external memories, the above mentioned operation may be executed for each of the types of the external memories.

In the above mentioned embodiment, the historical data is stored in the RAM of the image forming device. However, it is understood that various types of memory devices such as a non-volatile memory (e.g., an NVRAM) can be used to store the historical data.

What is claimed is:

1. An image forming device, comprising:
a connection unit to which an external memory is detachably attached;
a reading unit configured to read an image from an original to generate image data;
an image forming unit configured to form an image on a recording medium;
a controller configured to execute a plurality of modes including a scan-to-memory mode where image data is obtained through the reading unit and the obtained image data is stored in the external memory connected to the connection unit and a direct print mode where an image corresponding to image data stored in the external memory is formed through the image forming unit on the recording medium; and
a storage unit configured to store mode information concerning at least one mode of the plurality of modes, the at least one mode having been executed by the controller with respect to the external memory,
wherein the controller, in response to connection of the external memory to the connection unit, executes the at least one mode based on the mode information when stored in the storage unit.

2. The image forming device according to claim 1, further comprising:
a read parameter setting unit configured to set reading conditions used for execution of the scan-to-memory mode, wherein:
the storage unit further stores the reading conditions which the controller uses to execute the scan-to-memory mode; and
the controller executes the scan-to-memory mode in accordance with the reading conditions stored in the storage unit if the mode information concerning the at least one mode stored in the storage unit represents the scan-to-memory mode.

3. The image forming device according to claim 1, wherein the controller stores a file of the image data in the external memory in a file format matching a file format of a file stored in the external memory when the controller executes the scan-to-memory mode in response to connection of the external memory to the connection unit.

4. The image forming device according to claim 2, wherein the reading conditions include a file format for storing of image data,
the image forming device further comprising:
a selection unit configured to select one of an operation where the scan-to-memory mode is executed in accordance with the reading conditions stored in the storage unit and an operation where a file of the image data is stored in the external memory in a file format matching a file format of a file stored in the external memory.

5. The image forming device according to claim 4, wherein:
the storage unit stores memory full information in response to the external memory being in a memory full state during execution of the scan-to-memory mode; and
the controller executes the scan-to-memory mode in accordance with the operation selected by the selection unit if the mode information stored for the external memory which was connected to the connection unit last time represents the scan-to-memory mode and the memory full information is not stored for the external memory which was connected to the connection unit last time, and executes the scan-to-memory mode in accordance with the reading conditions stored in the storage unit if the mode information stored for the external memory which was connected to the connection unit last time represents the scan-to-memory mode and the memory full information is stored for the external memory which was connected to the connection unit last time.

6. The image forming device according to claim 1, further comprising:
a command input unit configured to accept a command indicating whether the controller continues the scan-to-memory mode or the controller suspends the scan-to-memory mode;
wherein:
the controller moves to a state of waiting for the command from the command input unit when the controller starts to execute the scan-to-memory mode in response to connection of the external memory to the connection unit; and
after moving to the state of waiting, the controller continues the scan-to-memory mode if the command from the command input unit indicates continuation of the scan-to-memory mode, while the controller suspends the scan-to-memory mode if the command from the command input unit indicates suspending of the scan-to-memory mode.

7. The image forming device according to claim 1, further comprising:
a print condition setting unit configured to set print conditions used for execution of the direct print mode;
the storage unit further stores the print conditions which the controller uses to execute the direct print mode; and
the controller executes the direct print mode in accordance with the print conditions stored in the storage unit if the mode information concerning the at least one mode stored in the storage unit represents the direct print mode.

8. The image forming device according to claim 1, wherein the controller does not start to execute the plurality of modes if the mode information is not stored in the storage unit when the external memory is connected to the connection unit.

9. The image forming device according to claim 1, further comprising:
a command input unit configured to accept a command indicating whether the controller continues the direct print mode or the controller suspends the direct print mode;
wherein:
the controller moves to a state of waiting for the command from the command input unit when the controller starts to execute the direct mode in response to connection of the external memory to the connection unit; and after moving to the state of waiting, the controller continues the direct print mode if the command from the command input unit indicates continuation of the direct print mode, while the controller suspends the direct print mode if the command from the command input unit indicates suspending of the direct print mode.

10. The image forming device according to claim 1, further comprising:
a setting unit configured to set whether to execute the at least one mode stored in the storage unit, wherein the controller operates in accordance with setting made by the setting unit in response to connection of the external memory to the connection unit.

11. The image forming device according to claim 1, wherein the reading unit comprises a detection unit configured to detect an original, and the image forming device further comprises:
a switch unit configured to switch operations between a normal operation mode where the controller executes a mode stored in the storage unit and a detection operation mode where the controller executes the scan-to-memory mode when the original is detected by the detection unit and executes the direct print mode when the original is not detected by the detection unit.

12. The image forming device according to claim 6, wherein:
the reading unit comprises a detection unit configured to detect an original,
the controller is configured such that in a case where the command indicating suspending is accepted by the command input unit, the controller executes the scan-to-memory mode if the original is detected by the detection unit while the controller executes the direct print mode if the original is not detected by the detection unit.

13. An image forming device, comprising:
a connection unit to which an external memory is detachably attached;
a reading unit configured to read an image from an original to generate image data;
an image forming unit configured to form an image on a recording medium;
a processing unit;
memory storing machine readable instructions that, when executed by the processing unit, cause the processing unit to function as a controller that executes, in response to the external memory being connected to the connection device, one of
a scan-to-memory mode where image data is obtained through the reading unit and the obtained image data is stored in the external memory connected to the connection unit, and
a direct print mode where an image corresponding to image data stored in the external memory is formed through the image forming unit on the recording medium; and
a storage unit configured to store historical data relating to a previous execution by the controller with respect to the external memory of at least one of the scan-to-memory mode and the direct print mode,
wherein the controller executes the one of the scan-to-memory mode and direct print mode based on the historical data when the historical data for the previous execution of the one of the scan-to-memory mode and direct print mode by the controller with the respect to the external memory is stored in the storage unit.

14. The image forming device according to claim 13, wherein the memory stores machine readable instructions that, when executed by the processing unit, causes the processing unit to judge whether historical data is stored in the external memory when the external memory is connected to the connection unit, wherein the controller does not execute either one of the scan-to-memory mode or the direct print mode if the historical data is not judged to be stored in the storage unit.

15. The image forming device according to claim 13, wherein the memory stores machine readable instructions that, when executed by the processing unit, causes the processing unit to
set reading conditions used for execution of the scan-to-memory mode based on user input,
wherein the storage unit further stores the reading conditions which the controller uses to execute the scan-to-memory mode, and
wherein the controller executes the scan-to-memory mode in accordance with the reading conditions stored in the storage unit if the historical data stored in the storage unit relates to previous execution by the controller with respect to the external memory of the scan-to-memory mode.

16. The image forming device according to claim 15, wherein the reading conditions include a file format for storing of image data, and the image forming device further comprises:
an input unit configured to receive a user selection of one of an operation where the scan-to-memory mode is executed in accordance with the reading conditions stored in the storage unit and an operation where a file of the image data is stored in the external memory in a file format matching a file format of a file stored in the external memory.

17. The image forming device according to claim 13, wherein the memory stores machine readable instructions that, when executed by the processing unit, causes the processing unit to
set print conditions used for execution of the direct print mode based on user input,
wherein the storage unit further stores the print conditions which the controller uses to execute the direct print mode, and
wherein the controller executes the direct print mode in accordance with the print conditions stored in the storage unit if the historical data stored in the storage unit relates to previous execution by the controller with respect to the external memory of the direct print mode.

18. The image forming device according to claim 13, wherein the memory stores machine readable instructions that, when executed by the processing unit, causes the processing unit to store a file of the image data in the external memory in a file format matching a file format of a file stored in the external memory when the controller executes the scan-to-memory mode in response to connection of the external memory to the connection unit.

19. The image forming device according to claim 13, wherein the reading unit comprises a detection unit configured to detect an original, and wherein the memory stores machine readable instructions that, when executed by the processing unit, causes the processing unit to:
switch between a normal operation mode where the controller executes one of the scan-to-memory mode and the direct print mode based on the historical data stored in the storage unit and a detection operation mode where the controller executes the scan-to-memory mode when the original is detected by the detection unit and executes the direct print mode when the original is not detected by the detection unit.

20. The image forming device according to claim 13, wherein the memory stores machine readable instructions that, when executed by the processing unit, causes the processing unit to establish a setting representing which one of the scan-to-memory mode and the direct print mode to execute based on the historical data stored in the storage unit, wherein the controller executes the one of the scan-to-memory mode and the direct print mode in accordance with the setting in response to connection of the external memory to the connection unit.

* * * * *